Aug. 27, 1935. R. B. LAWTON Re. 19,682

GROOVED SUPPORTING FORK FOR GLOBES

Original Filed July 8, 1931

Inventor
Robert B. Lawton.
Charles Hill
Atty.

by

Reissued Aug. 27, 1935 Re. 19,682

UNITED STATES PATENT OFFICE 19,682

GROOVED SUPPORTING FORK FOR GLOBES

Robert B. Lawton, Chicago Heights, Ill., assignor to Weber Costello Co., Chicago Heights, Ill., a corporation of Illinois Original No. 1,897,580, dated February 14, 1933, Serial No. 549,398, July 8, 1931. Application for reissue February 19, 1934, Serial No. 712,084

3 Claims. (Cl. 35—46)

The present invention relates to a globe and more particularly to an improved supporting fork which is grooved for the reception of a movable globe carrying meridian whereby the axis of the globe may be quickly and conveniently adjusted at desired angles by means of graduations provided on the sides of the grooved supporting fork.

It is an object of this invention to provide an improved fork having a groove provided in the inner peripheral surface thereof for the reception of a rotatable globe carrying meridian.

It is also an object of this invention to provide an improved grooved supporting fork for a globe carrying meridian, said fork having degree marks provided thereon extending in opposite directions from a zero mark to facilitate adjustment of the axis of the earth from zero up to 23½°.

It is an important object of this invention to provide an improved and simplified grooved supporting fork having degree graduations on opposite sides thereof and also having means for coaction with a flanged globe carrying meridian to prevent the meridian from being disengaged from the fork when the meridian is rotatably adjusted with respect to the fork.

Other and further important objects of this invention will be apparent from the disclosures in the specification and the accompanying drawing.

The invention (in a preferred form) is illustrated in the drawing and hereinafter more fully described.

Figure 1:
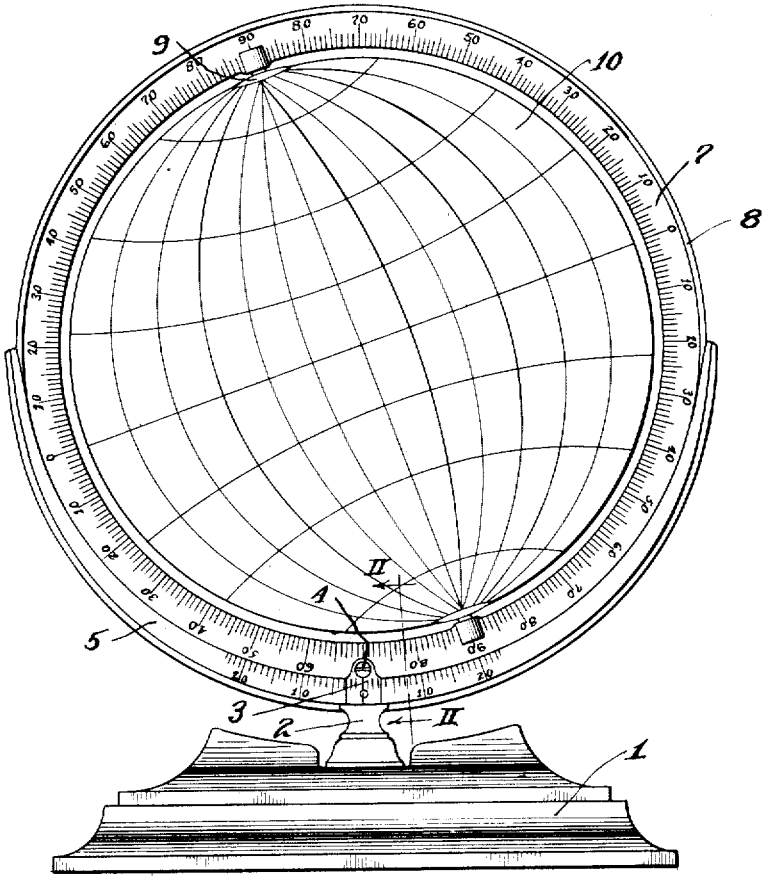
Figure 1 is a front elevation of a globe which is rotatably supported in a meridian which in turn is rotatable in a grooved and graduated meridian supporting fork embodying the principles of this invention.

The reference numeral 1 indicates a pedestal or base having mounted thereon a supporting post or stand 2. Secured on the top of the post 2 is a bracket or arm 3 having a threaded aperture therein through which a retaining screw 4 is adjustably engaged.

Figure 2:
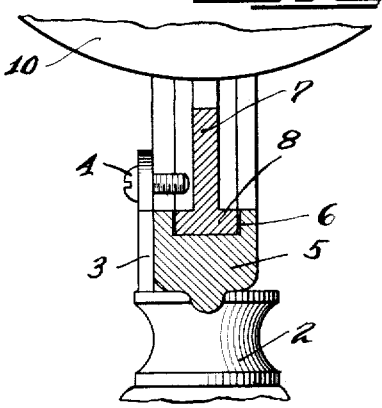
Figure 2 is an enlarged fragmentary sectional view taken on line II—II of Figure 1.

Rigidly secured upon the top of the post 2 is an arcuate or crescent shaped supporting fork 5 which is widest at its middle portion and which gradually tapers toward both ends. The supporting fork 5 is constructed of cast metal or other suitable material and said fork is positioned against the inner side of the arm 3 and as clearly illustrated in Figure 2 is provided with a groove 6 which is formed in the inner peripheral surface of the fork and extends from one end of the fork to the other. Provided on each side of the fork 5 are a series of graduations or markings which extend in opposite directions from a zero degree mark up to 23½° which indicates the inclination of the earth's axis.

Seated in the fork groove 6 is a movable or rotatable meridian or ring 7 provided with an integral outer peripheral rim or flange 8 which is adapted to track in the fork groove 6. As clearly illustrated in Figure 2, the screw 4 has the inner end thereof positioned to project inwardly adjacent one side of the meridian 7 and to the inside of the meridian flange 8 permitting rotation of the meridian but on the other hand serving as a means for preventing the meridian from falling out or being removed from the supporting fork. Both sides of the meridian 7 are provided with degree graduations or markings.

Rotatably supported diametrically in the meridian 7 is an axis 9 on which a globe 10 is supported.

It will be noted that the improved globe unit is provided with a supporting fork having a continuous groove therein extending from one end to the other for receiving the globe carrying meridian the rim or flange of which slidably seats in the fork groove 6 between the side flanges of the fork which form the groove 6. With the opposite sides of the fork provided with degree graduations ranging from zero in opposite directions to 23½° a convenient arrangement is provided whereby the axis of the globe may be readily adjusted from a vertical position of zero degree to varying inclinations from zero up to 23½° on either side of the zero mark.

It will be clear that the fork 5 provides a trough having radially and inwardly extending opposed flanges or walls, and that as the meridian ring is being entered to seat in the trough these walls provide guide means to simplify the task of vertically alining the edge of the meridian ring with the supporting seat.

It will of course be understood that various details of construction may be varied through a wide range without departing from the principles of this invention, and it is therefore not purposed to limit the patent granted hereon otherwise than necessitated by the scope of the appended claims.

I claim as my invention:

1. A globe device comprising a vertically positioned circular meridian ring adapted to support a globe, a base for said device, channeled support means on said base providing an arcuate seat for slidably supporting said ring and also providing guide means for said meridian ring as it is being entered in said seat, said channeled support means comprising a fixed approximately semi-annular ring section having a longitudinally extending channel concentric with the outer periphery of said ring section, and having opposed flanges along a major portion of its length facing opposite faces of said meridian ring.

2. A globe device comprising a vertically positioned meridian ring having a peripheral flange, a base for said device, channeled support means on said base providing an arcuate seat for slidably supporting said ring and also providing guide means for said meridian ring as it is being entered in said seat, said channeled support means comprising a fixed approximately semi-annular ring section having a longitudinally extending channel concentric with the outer periphery of said ring section to receive said flange, and having opposed flanges along a major portion of its length facing opposite faces of said meridian ring.

3. A globe device comprising a vertically positioned circular meridian ring, a globe mounted rotatably in said ring, a base, channeled support means on said base providing an arcuate seat for slidably supporting said ring and also providing guide means for said meridian ring as it is being entered in said seat, said channeled support means comprising a fork defining an approximately semi-annular ring section having radially inwardly opposed flanges along a major portion of its length and facing opposite faces of said meridian ring.

ROBERT B. LAWTON.